United States Patent [19]

Cipolla

[11] 4,131,192

[45] Dec. 26, 1978

[54] LAMP PARTS FEEDING DEVICE HAVING ROTATING REFERENCE FRAME

[75] Inventor: Thomas M. Cipolla, Ballston Lake, N.Y.

[73] Assignee: General Electric Company, Schenectady, N.Y.

[21] Appl. No.: 832,395

[22] Filed: Sep. 12, 1977

[51] Int. Cl.² .................................................. B65G 47/00
[52] U.S. Cl. .................................. 198/469; 198/460; 198/482; 198/524; 198/535
[58] Field of Search ............ 198/347, 356, 360, 369, 198/391, 459, 469, 470, 480, 482, 524, 526, 528, 535, 562, 460; 221/156, 68

[56] References Cited

U.S. PATENT DOCUMENTS

| | | | |
|---|---|---|---|
| 2,760,679 | 8/1956 | Chadderton et al. | 221/225 |
| 2,818,964 | 1/1958 | Picard et al. | 198/459 |
| 2,936,556 | 5/1960 | Gibson | 198/356 |
| 3,365,083 | 1/1968 | Baumann et al. | 198/369 |
| 3,970,214 | 7/1976 | Thimot | 198/391 |

FOREIGN PATENT DOCUMENTS

| | | | |
|---|---|---|---|
| 1547892 | 11/1968 | France | 198/526 |
| 508456 | 3/1976 | U.S.S.R. | 198/535 |

*Primary Examiner*—Joseph E. Valenza
*Attorney, Agent, or Firm*—Paul F. Wille; Lawrence R. Kempton; Frank L. Neuhauser

[57] ABSTRACT

A parts feeder is disclosed in which randomly grouped parts are stored, oriented and discharged at a uniform rate from a rotating or indexing spacer wheel fed by stepwise movable supply apparatus having the rotating spacer wheel as its frame of reference.

9 Claims, 3 Drawing Figures

LAMP PARTS FEEDING DEVICE HAVING ROTATING REFERENCE FRAME

This invention relates to apparatus for handling small parts and, in particular, relates to apparatus for orienting, temporarily storing, and discharging lamp filaments at a uniform rate or spacing.

In the prior art, a variety of devices have been used to remove parts from bulk, orient and load the parts into apparatus for combining various parts into a finished product. In lamp making, coiled-coil filaments have proven particularly difficult to handle due to the tendency thereof to tangle and due to the "springiness" of coiled-coil filaments.

A partial solution has been the use of a vibrating parts feeder, well known in the art, wherein the filaments are bulk loaded into a vibrating bowl having a spiral track around the inside thereof. Due to the vibration, the filaments work their way around the track and up the sides of the bowl to a discharge point.

Even with the vibrating feeder, some problems remain. A first is that the vibrating feeder does not feed at a uniform rate. A second is that, even if the rate were uniform, the feeder must be synchronized with the succeeding machine.

One approach taken in the prior art is to use a buffer to temporarily store the filaments and discharge them at a uniform rate. To assure an oversupply of filaments, the feed rate from the vibrating feeder is greater than the take-up rate of the next machine. As each part is fed from the buffer, the vibrating feeder is turned on and off to replenish the supply. This entails needless rehandling of the filaments by the equipment and often causes the filaments to contact one another, which raises the chances for a defective filament being used in a lamp.

SUMMARY OF THE INVENTION

In view of the foregoing, it is therefore an object of the present invention to provide an improved parts feeding device.

Another object of the present invention is to provide a parts feeder for orienting and feeding parts at a uniform rate or spacing.

A further object of the present invention is to provide a parts feeder having variable storage enabling it to receive parts at a non-uniform rate.

Another object of the present invention is to provide a parts feeder which minimizes the need to shut down the equipment supplying parts thereto.

A further object of the present invention is to provide a parts feeder which can be synchronized with succeeding equipment.

The foregoing objects are achieved in the present invention wherein parts are received randomly, e.g., from a vibrating bowl feeder, by an input located along the axis of a rotating, circular tray having compartments uniformly located around the periphery thereof. The input is connected to a discharge arm which extends radially outward to the periphery of the tray. The arm is incrementally rotated in one direction by suitable drive means. A second drive means rotates or indexes the tray and the first drive means at an approximately uniform rate in the opposite direction. Control apparatus connected to the first drive means senses the presence of parts at the input and feeds the parts one each to a compartment on the tray while incrementally rotating the arm. If no part is sensed, the arm is not moved relative to the rotating tray.

BRIEF DESCRIPTION OF THE DRAWINGS

A more complete understanding of the present invention can be obtained by considering the following detailed description in conjunction with the accompanying drawings, in which:

As illustrated in FIG. 1, a vibrating bowl feeder 10, known per se in the art, has a spiral track 11 on the inside thereof and along which filaments 12 are caused to travel due to the vibrations. As the filaments approach the discharge point of the feeder, they pass under air tube 13 from which air is blowing on track 11 in the forward direction. When a filament enters the airstream, it is accelerated forward and into transfer tube 14. Transfer tube 14 is equipped with an airtube 15 which causes air to flow through transfer tube 14, carrying the coils with it. Air tube 15 is positioned relative to transfer tube 14 so as to cause a venturi effect in transfer tube 14, i.e. air drawn in at the inlet end of transfer tube 15 causing the filaments to be sucked in and through the transfer tube.

Figure 1:
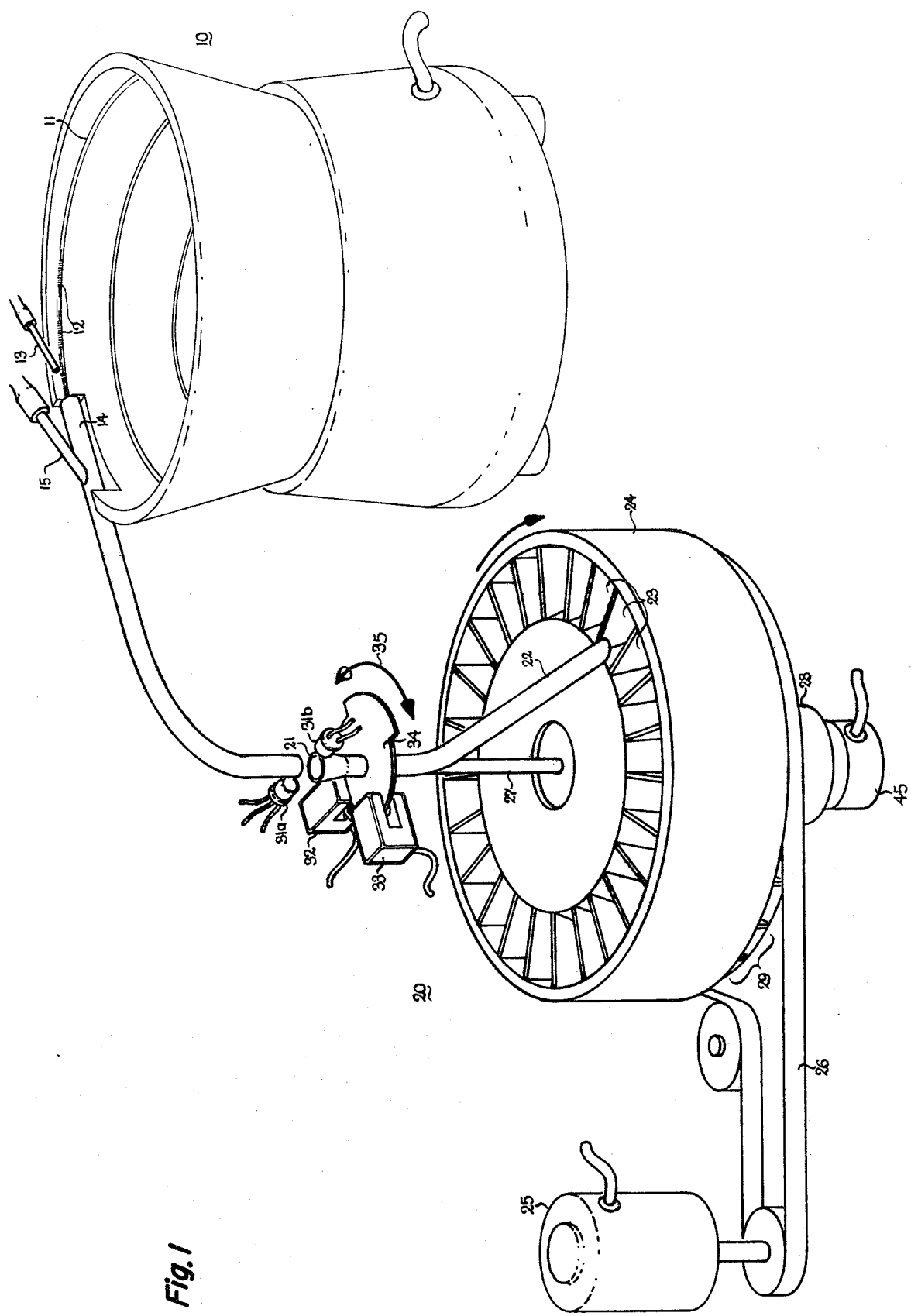
FIG. 1 is a perspective view of a preferred embodiment of a parts feeder in accordance with the present invention.

Filaments leaving the discharge end of transfer tube 14 pass through a gap and then into parts feeding device 20 in accordance with the present invention. Specifically, the filaments are received by conical portion 21 of rotating discharge arm 22 and are deposited into one of a plurality of compartments 23 uniformily spaced about the periphery of tray 24. Tray 24 is rotated at a constant rate in a single direction under the control of a suitable drive motor 25 which is mechanically coupled to tray 24 by way of belt 26. Collinear with the axis of rotation of tray 24 is a central shaft 27, to which discharge arm 22 is attached, and which is stepwise rotated in the opposite direction from tray 24 by a suitable stepper motor 28.

As used in connection with tray 24, the term "rotate" is intended to include both continuous turning and "indexing", which is understood by those in the art to mean intermittent motion where the tray is rotated a given amount, then stopped, then rotated, etc., at a certain rate, e.g. twenty indexes per minute.

Control of parts feeder 20 is derived through sense apparatus located at the entrance to discharge arm 22. Specifically, the presence of a filament is detected by way of source 31a and sensor 31b, which may for example comprise a light source and photocell respectively. When a filament is detected, a signal is sent by way of suitable electronics, not shown, to stepper motor 28 causing it to step one position thereby moving discharge arm 22 in a counter-clockwise direction to position the end of the discharge arm over the next adjacent compartment. This stepwise motion of discharge arm 22 occurs while the filament is traveling through it. Thus when the filament is discharged from arm 22 it is deposited in the next adjacent compartment. Stepper motor 28 is mechanically attached to rotating tray 24 and turns therewith. Thus, when not actuated discharge arm 22 remains in position above a particular compartment and, as seen by an outside observer, discharge arm 22 rotates with tray 24.

As illustrated in FIG. 1, tray 24 rotates clockwise while stepper motor 28 causes discharge arm 22 to rotate stepwise in a counter-clockwise direction as each filament is received at random from vibrating feeder 10. The filaments are discharged from feeder 20 in region 29 at a uniform rate through slots in the outside portion of compartments 23. The number of compartments containing a single filament between and including the compartment underneath discharge arm 22 and region 29 varies with the rate at which the filaments are randomly supplied by vibrating feeder 10. The variable storage capacity provided by feeder 20 thus enables a uniform discharge rate or spacing in region 29 despite the randomly supplied filaments from feeder 10.

Figure 3:
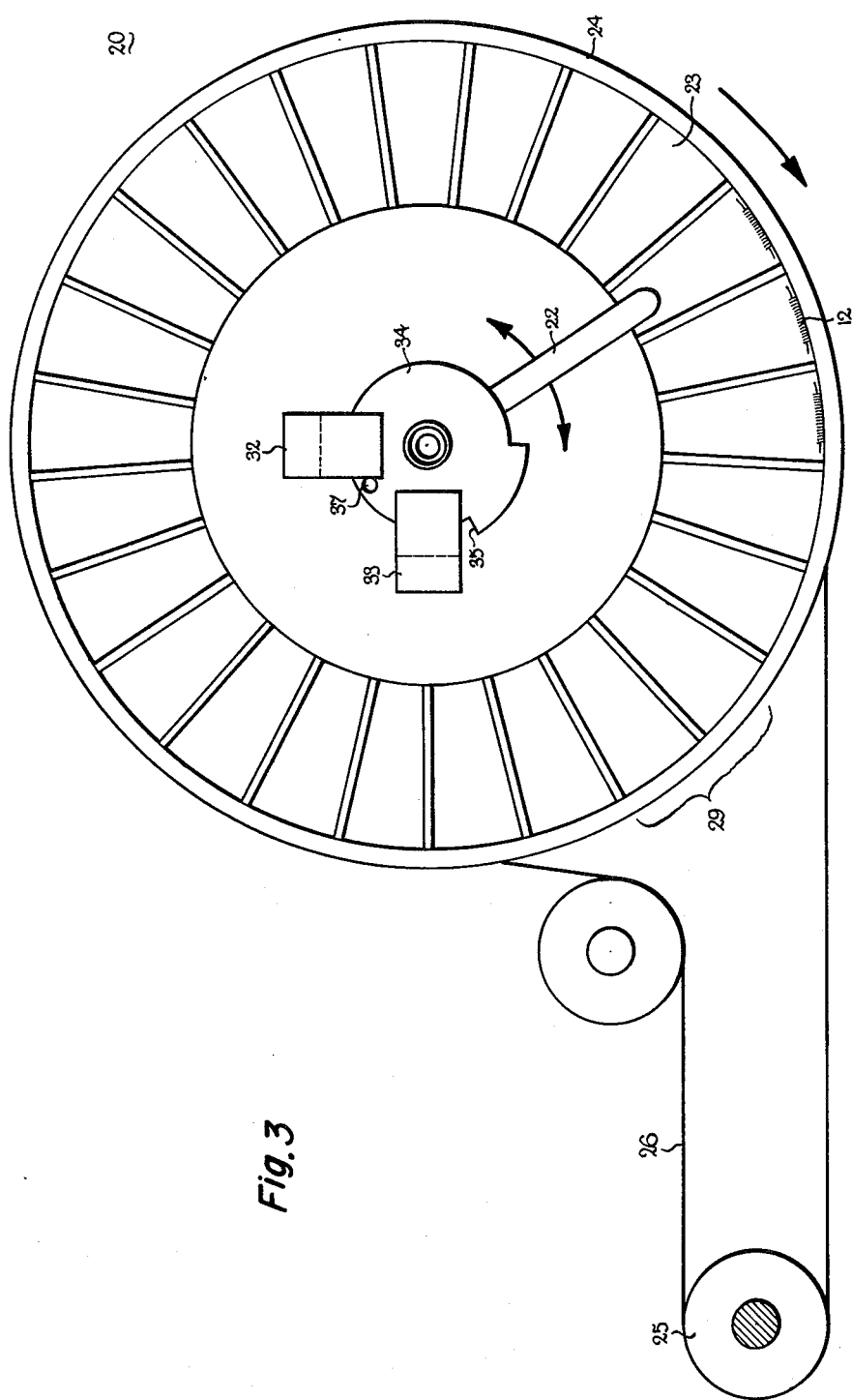
FIG. 3 is a top view of the tray and control apparatus of the embodiment of FIG. 1.

Sensors 32 and 33 and shaped disc 34, attached to discharge arm 22, detect the angular position of discharge arm 22 at predetermined limits, as seen by an outside observer, depending upon supply and demand conditions on feeder 20, as explained more fully in conjunction with FIG. 3.

Figure 2:
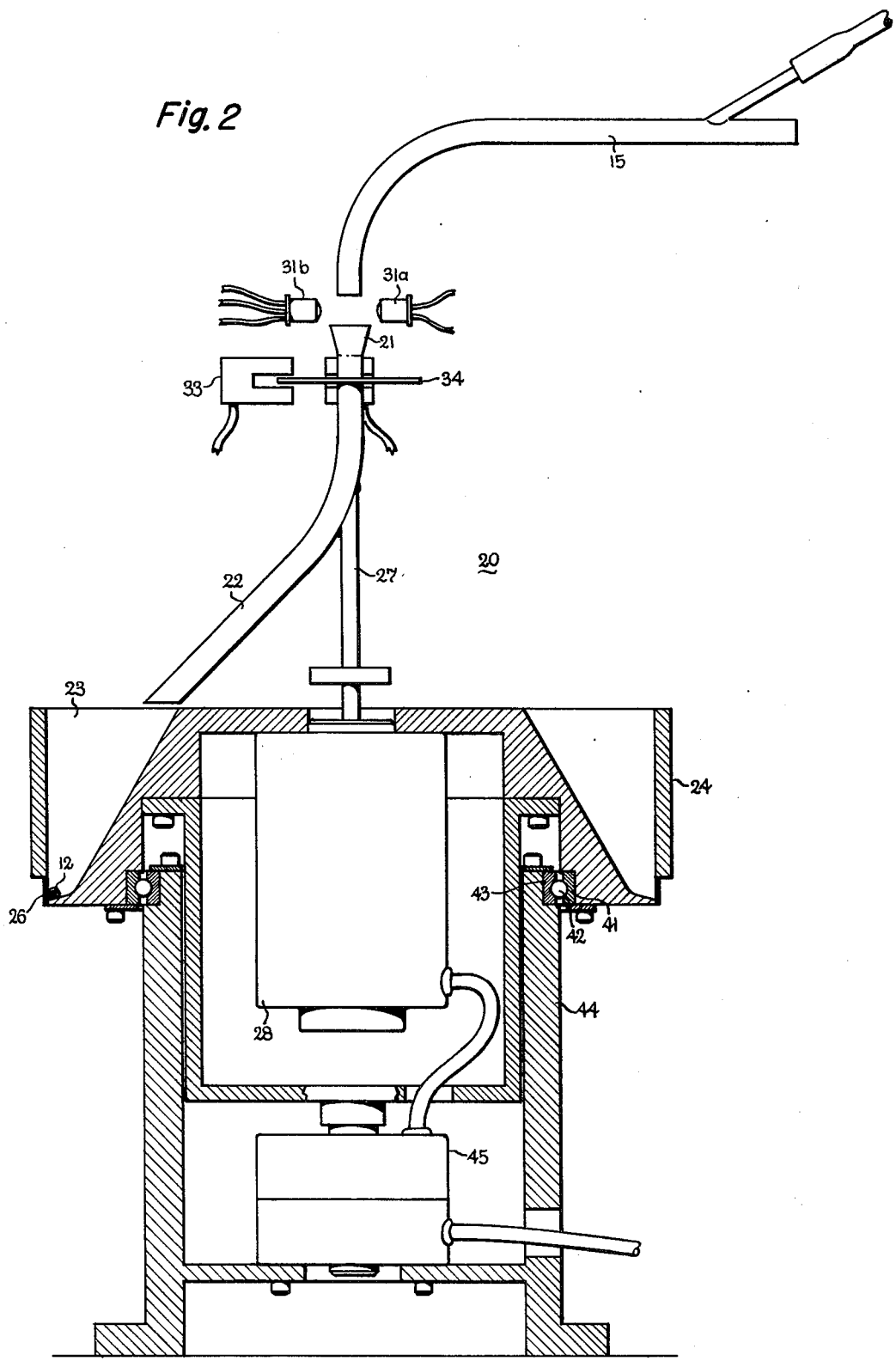
FIG. 2 is a side view of the internal apparatus of the embodiment of FIG. 1.

FIG. 2 illustrates in detail the mechanical construction of part feeder 20. Specifically, tray 24 comprised a plurality of compartments 23 having a radially sloped portion which serves to both orient the filaments approximately tangential to the periphery of tray 24 and guide them to an aperture in the compartment through which the filaments are discharged. Tray 24 is mounted on suitable bearing, such as a ballbearing system comprising an outer-race 41 attached to tray 24, ball-bearings 42, and an inner-race 43 attached to base 44. As appreciated by those of skill in the art, other types of bearings may be used instead.

Stepper motor 28 receive signals by way of commutating rings 45 which are also attached to base 44 and electrically connected to motor 28 by way of a cable through an aperture in the motor housing. The construction details of a stepper motor and commutating rings are well known to those of skill in the art.

Output shaft 27 of stepper motor 28 is suitably fastened e.g. welded, to discharge arm 22. Discharge arm 22 has the upper portion thereof positioned collinear with the axis of stepper motor 28 and the lower portion thereof curved so that the end is located above the openings for compartments 23. As can be seen by inspection of FIG. 2, the filaments move in a lengthwise direction through transfer tube 15 and discharge arm 22 and are then reoriented approximately ninety degrees by virtue of the tapered cross-section of compartments 23. Each filament is stored in the narrow portion of compartment 23 immediately adjacent an opening which is temporarily blocked by belt 26. It will be appreciated by those of skill in the art that belt 26 provieds a dual function, viz. the rotation of tray 24 and the closure of all of the compartments but the particular compartment to be emptied. If desired, these functions can be separated, e.g. by using separate drive and closure belts or means.

FIG. 3 illustrates a top view of parts feeder 20 and illustrates the control sensors utilized in the present invention. Specifically, discharge arm 22 may be supplied with filaments at a rate that is either higher or lower than the uniform rate at which filaments are removed from compartments 23. Thus, to the outside observer, discharge arm 22 will appear to move in either a clockwise or counter-clockwise direction, as indicated by the bi-directional arrow. However, discharge arm 22 actually moves only in one direction, in a stepwise fashion, opposite to the direction of tray 24. If no filaments are received from the vibrating bowl feeder, then no control pulse is supplied by detector 31b to step discharge arm 22 to the next compartment and discharge arm 22 remains in position above a given compartment, rotating with tray 24. If the condition persists to the point where tray 24 becomes empty, tab 35 on disc 34 intercepts sensor 33 which may, for example, comprise another light source and photocell, causing it to produce a pulse to step discharge arm 22 to the next compartment. Thus, discharge arm 22 is maintained in a position above the compartment about to move into discharge area 29.

Conversely, if filaments are supplied at a rate higher than the rate at which they are withdrawn, discharge arm 22 is stepped around in a counter-clockwise direction with respect to tray 24 progressively filling more of the compartments, thereby providing a variable length storage of the filaments. If the condition persists, a point will be reached at which tab 35 intercepts sensor 32. At this point, the vibrating bowl feeder is shut off to halt the supply of filaments to parts feeder 20. Tray 24 is then permitted to either partially or fully unload, at which point the vibrating bowl feeder is turned on again to supply more filaments.

Since it is desirable to have some filaments accumulated, a time delay circuit can be provided in the electronics associated with sensor 32 for turning on the vibrating bowl feeder after a predetermined delay. The electronics associated with sensors 32 and 33 is straightforward and within the capabilities of one of skill in the art. As is also apparent to those of skill in the art, various alternatives may be used to sense the degree of rotation of discharge arm 22. For example, instead of tab 35, disc 34 may be provided with apertures, such as aperture 37.

There is thus provided by the present invention an improved parts feeder for receiving parts randomly from bulk and feeding them at a uniform rate or spacing. Further, the feeder is easily synchronized with succeeding equipment, even indexing equipment, since the discharge arm utilizes the tray as its frame of reference and, within limits as described above, operates independently thereof.

Having thus described the invention it will be apparent to those of skill in the art that various modifications can be made within the spirit and scope of the present invention. For example, while described as a tube, discharge arm 22 may comprise a channel, depending upon the particular part being fed. Further, while described in a preferred embodiment as being utilized for lamp filaments, it is apparent to those of skill in the art that other lamp parts may be fed in accordance with the present invention with suitable modification in the conveying means, i.e. transfer tube 15 and discharge tube 22 and in compartments 23 to suitably accommodate the particular part. While described and illustrated as circular, tray 24 may also be a polygon, i.e. the outside wall of compartments 23 may be planar.

What I claim as new and desire to secure by United States Letters Patent is:

1. A parts feeder for receiving parts at a variable rate and supplying those parts at a uniform rate or spacing comprising:
   a generally circular tray having a plurality of storage means located about the periphery thereof;

means connected to said tray for rotating said tray at constant speed;

conveyor means having an entrance portion collinear with the axis of rotation of said tray and a portion extending over said storage means; said conveyor means being mounted for rotation about said axis of rotation in synchronism with the rotation of said tray;

stepper means connected to said tray and to said conveyor means for intermittently moving said conveyor means relative to said tray means; and means for controlling the angular position of said conveyor means.

2. The parts feeder as set forth in claim 1 wherein said control means comprises:

sensing means for detecting the presence of a part at the entrance portion of said conveyor means and for actuating said stepper means when a part is detected.

3. The parts feeder as set forth in claim 2 wherein said control means further comprises:

angular limit detection means for sensing the angular position of said conveyor means.

4. The parts feeder as set forth in claim 3 wherein said angular limit detection means comprises a shaped disc attached near the entrance portion of said conveyor means and photocell means located adjacent said disc.

5. The parts feeder as set forth in claim 4 wherein said disc has a variable radius to indicate said limit.

6. The parts feeder as set forth in claim 4 wherein said disc has at least one aperture to indicate said limit.

7. The parts feeder as set forth in claim 1 wherein the axis of rotation of said tray is approximately vertical and said storage means comprise:

compartments having an open top for receiving said parts and a radially tapered cross-section for orienting the part.

8. The parts feeder as set forth in claim 7 wherein said compartments are narrower at the bottom than at the top and further comprise an aperture at the bottom through which said parts may be removed.

9. The parts feeder as set forth in claim 8 wherein said means for rotating said tray at constant speed includes belt means substantially surrounding said tray and covering most of said apertures to define a discharge zone comprising the apertures which are not covered.

* * * * *